(12) United States Patent
Lin et al.

(10) Patent No.: US 8,707,321 B2
(45) Date of Patent: Apr. 22, 2014

(54) RESOURCE SHARING SYSTEM AND METHOD THEREOF

(75) Inventors: Feng-Cheng Lin, Taipei (TW); Hao-Hsiang Chung, Taipei (TW)

(73) Assignee: Institute for Information Industry, Taipei (TW)

( * ) Notice: Subject to any disclaimer, the term of this patent is extended or adjusted under 35 U.S.C. 154(b) by 771 days.

(21) Appl. No.: 12/958,407

(22) Filed: Dec. 2, 2010

(65) Prior Publication Data

US 2012/0110576 A1 May 3, 2012

(30) Foreign Application Priority Data

Nov. 2, 2010 (TW) .............................. 99137651 A

(51) Int. Cl.
*G06F 9/50* (2006.01)
*G06F 9/455* (2006.01)
*G06F 15/16* (2006.01)
*H04L 29/08* (2006.01)

(52) U.S. Cl.
CPC .............. *G06F 9/50* (2013.01); *G06F 9/45533* (2013.01); *H04L 29/08144* (2013.01)
USPC ................................ 718/104; 718/1; 709/226

(58) Field of Classification Search
None
See application file for complete search history.

(56) References Cited

U.S. PATENT DOCUMENTS

| 2010/0070978 A1* | 3/2010 | Chawla et al. ................ 718/105 |
| 2011/0184993 A1* | 7/2011 | Chawla et al. ................ 707/802 |

FOREIGN PATENT DOCUMENTS

TW 201025065 7/2010

* cited by examiner

*Primary Examiner* — Qing Wu
(74) *Attorney, Agent, or Firm* — Jianq Chyun IP Office

(57) ABSTRACT

A resource sharing system for a plurality of user devices accessing at least one resource at the same time is provided. The system comprises a plurality of virtual machines and a connection broker. The virtual machines are established on at least one computer, wherein each user device corresponds to at least one of the virtual machines and each of the at least one resource corresponds to one of the virtual machines. The connection broker connects to the virtual machines and receives login information from each of the virtual machines and joins the virtual machines sending the login information into a group. Through the connection broker, the user devices share and access the resources corresponding to the virtual machines in the group.

14 Claims, 17 Drawing Sheets

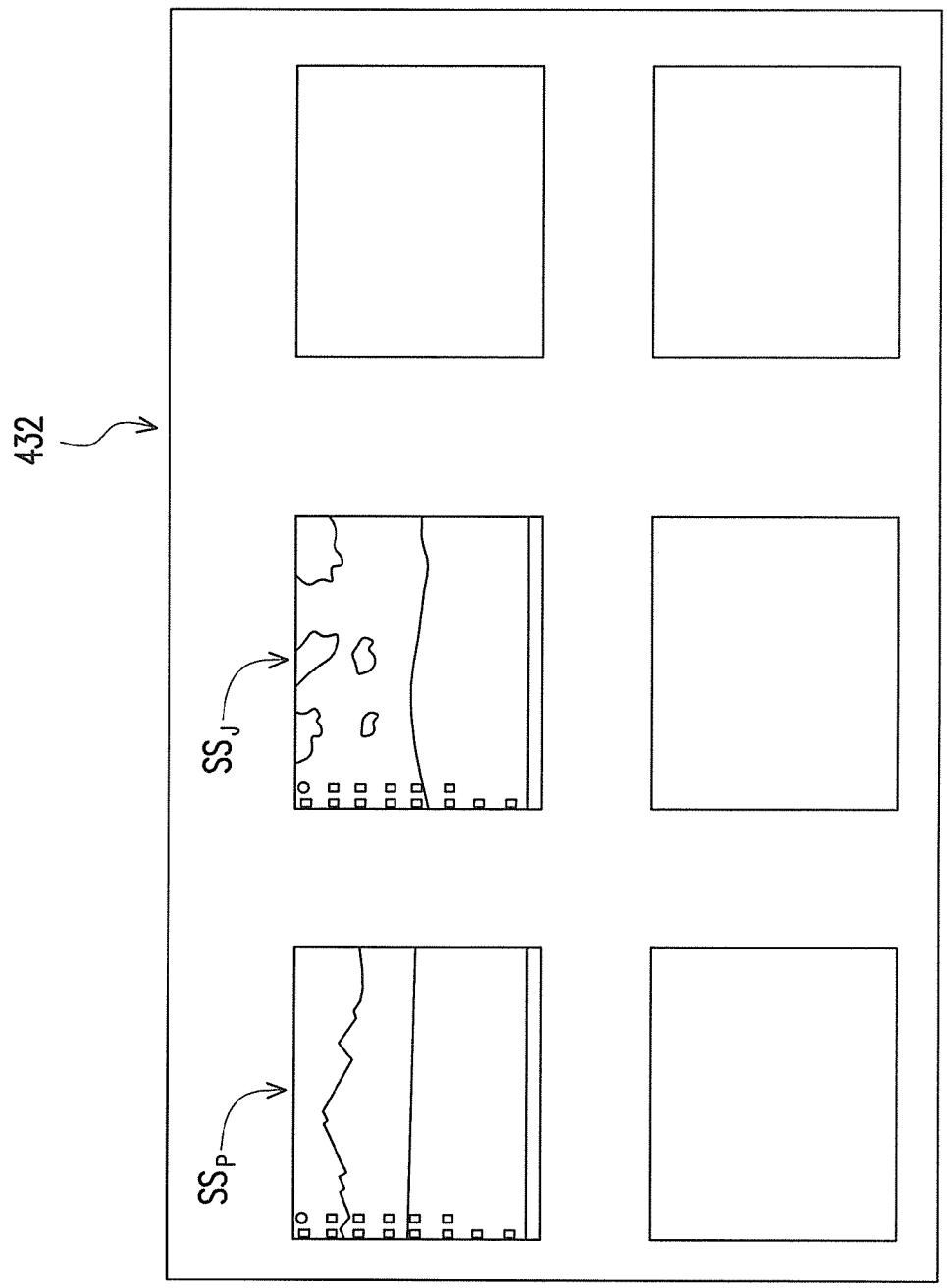

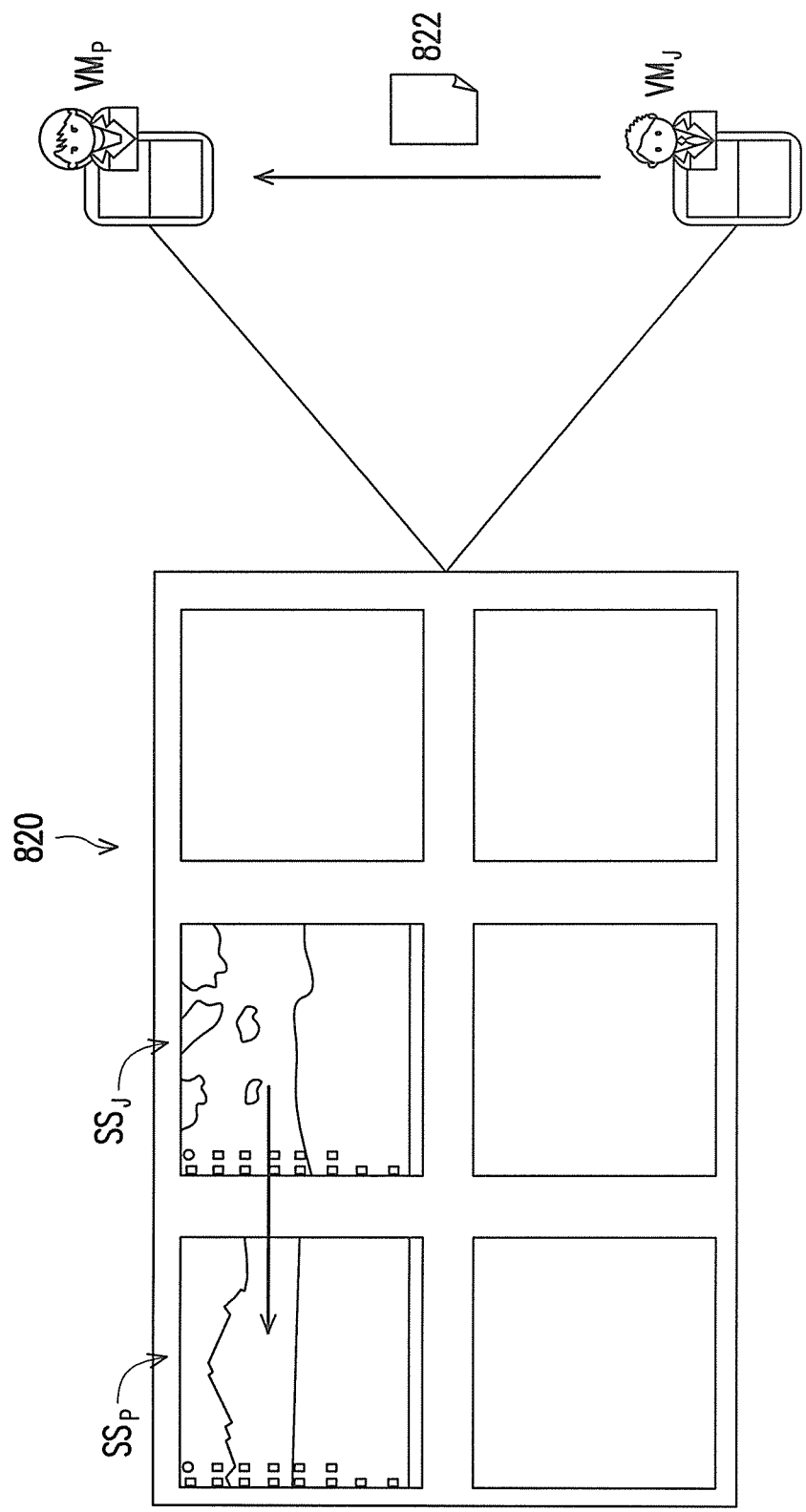

RESOURCE SHARING SYSTEM AND METHOD THEREOF

CROSS-REFERENCE TO RELATED APPLICATION

This application claims the priority benefit of Taiwan application Ser. no. 99137651, filed on Nov. 2, 2010. The entirety of the above-mentioned patent application is hereby incorporated by reference herein and made a part of this specification.

BACKGROUND

1. Field of the Invention

The invention relates to a resource sharing system and a method thereof. Particularly, the invention relates to a resource sharing system that a plurality of user devices shares and accesses resources through different virtual machines in a group and a method thereof.

2. Description of Related Art

With widespread of network constructions, more and more people or companies use networks to transmit data or provide various services by networks. In various network applications, a resource sharing mechanism is a commonly used mechanism.

Currently, a cross-area resource sharing mechanism has to be implemented by using "physical computers", though connection establishment and a sharing process of physical resources are rather complicated. Taking image sharing as an example, in a cross-area meeting system, operating system screens of multiple users cannot be simultaneously browsed and the operating system screens cannot be synchronously updated, and a same file cannot be synchronously modified. According to the conventional technique, only synchronous browsing and marking of a same image can be achieved.

In order to resolve the above cross-area resource sharing problem, the conventional technique provides a virtual machine hub, by which a remote virtual machine can recognize a local device through the virtual machine hub on the local device so as to the remote virtual machine access the local device. However, according to such method, resource sharing operations of multiple users in the virtual machines for the cross-area resource sharing cannot be achieved. Moreover, the conventional technique further provides a wireless projector, by which operating system screens of multiple users can be simultaneously displayed on a screen, and can be quickly switched. However, such hardware improvement faces a problem that a computer of each user has to be installed with specific software, and resources can only be shared within a same local area network, and users of a cross-area network cannot share the resources. Moreover, the conventional technique further provides an application program solution to achieve resource sharing purpose of multiple users. However, such solution also faces problems that the operating system screens cannot be quickly shared between the users, a same file cannot be simultaneously modified, and each user cannot browse the operating system screens of multiple users, etc.

SUMMARY OF THE INVENTION

The invention is directed to a resource sharing system and a method thereof, by which multiple users can share and access a same resource through a plurality of virtual machines, and a multi-display resource sharing environment is provided to the users, and snapshots of operating system screens of the virtual machines in the multi-display resource sharing environment can be updated in real-time.

The invention provides a resource sharing system for a plurality of user devices accessing at least one resource at the same time. The system comprises a plurality of virtual machines and a connection broker. The virtual machines are provided by at least one computer, where each of the user devices corresponds to one of the virtual machines and each of the at least one resource corresponds to one of the virtual machines. The connection broker is connected to the virtual machines and receives login information from each of the virtual machines and joins the virtual machines sending the login information into a group according to the login information. The user devices share and access the resources corresponding to the virtual machines in the group through the connection broker.

The invention provides a resource sharing method for a plurality of user devices accessing at least one resource at the same time. The resource sharing method can be described as follows. Each of the user devices is connected to a virtual machine, where each of the virtual machines corresponds to one of the at least one resource. Each of the user devices sends login information through the corresponding virtual machine. The virtual machine sending the login information is joined into a group according to each of the login information. The user devices corresponding to the virtual machines in the group access the resources corresponding to the virtual machines joined in the group.

According to the above descriptions, in the invention, a plurality of virtual machines and a connection broker are used to implement resource sharing (for example, file transmission) among the virtual machines, communication (including file transmission) between the user devices and the virtual machines, and connections between the user devices of multiple users and the virtual machine serving as the resource sharing machine through the connection broker, so as to operate the resource sharing device and share the resource corresponding to the resource sharing machine/virtual machine to achieve purposes of resource sharing and simultaneous accessing. Moreover, a multi-display resource sharing environment is provided to the users, and the users share the resources within the multi-display resource sharing environment, and update the snapshots of the operating system screens of the virtual machines within the multi-display resource sharing environment in real-time, so as to simplify an operation flow of resource sharing and improve utilization convenience.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4D is a schematic diagram illustrating a multi-display window according to an embodiment of the invention.

FIG. 8B is a schematic diagram of the method of FIG. 8A.

DETAILED DESCRIPTION OF DISCLOSED EMBODIMENTS

In the invention, a connection broker and at least one virtual machine are used to create a group, and user devices of multiple users can share, access and transmit resources corresponding to the virtual machines through the connection broker, and the user devices can operate a same virtual machine. The resource is, for example, a computer, a computer peripheral device (for example, a printer or a storage device), a virtual meeting room or a digital file, etc. A plurality of embodiments is provided below with reference of figures to describe a resource sharing system and a resource sharing method of the invention. It should be noticed that in the following embodiments, the same reference numbers denote the same or like components.

Figure 1:
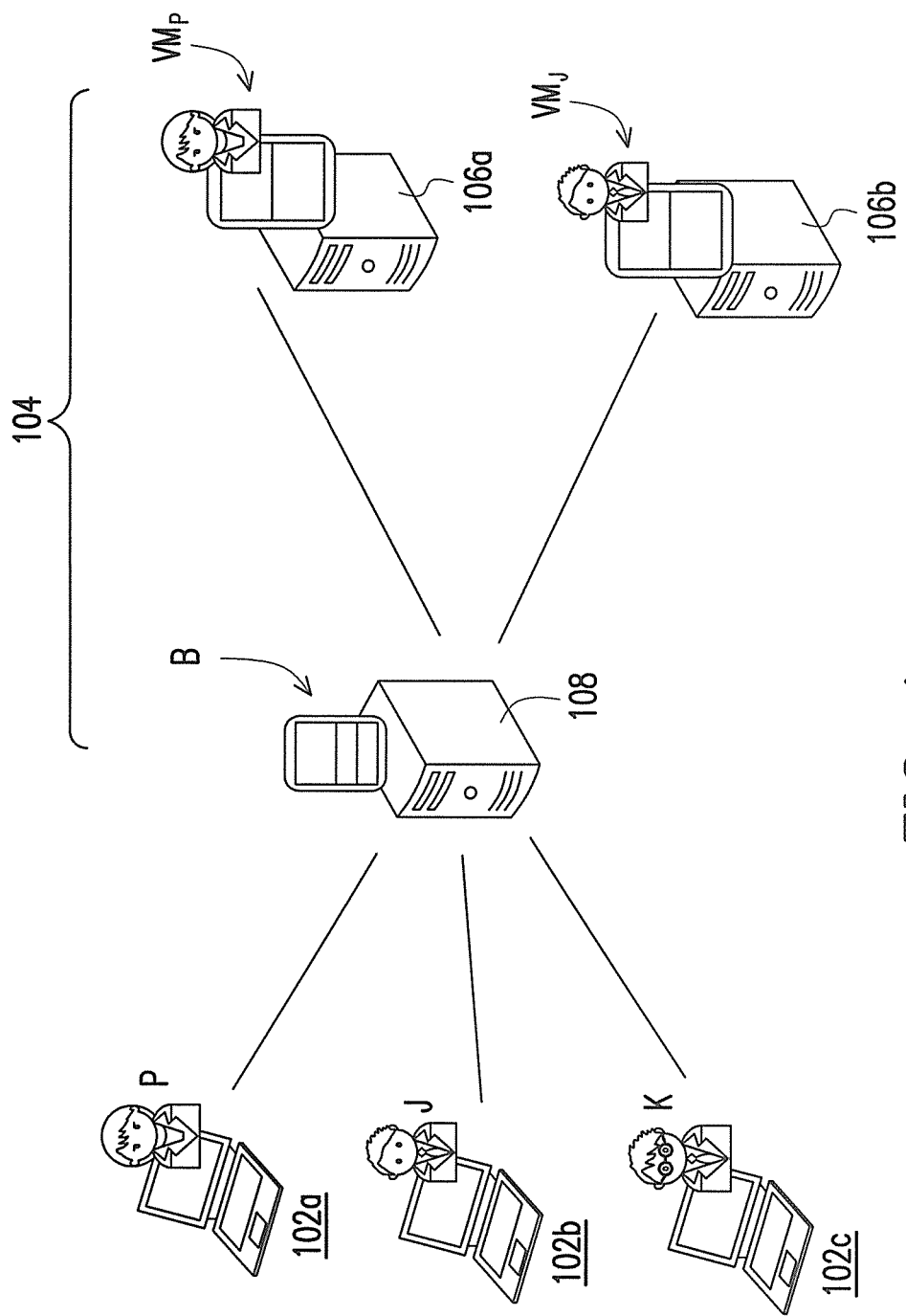
FIG. 1 is a schematic diagram illustrating a resource sharing system of multiple user devices according to an embodiment of the invention.

FIG. 1 is a schematic diagram illustrating a resource sharing system of multiple user devices according to an embodiment of the invention. Referring to FIG. 1, in the present embodiment, user devices 102a, 102b and 102c respectively correspond to users P, J and K, and the resource sharing system 104 includes a plurality of virtual machines $VM_P$ and $VM_J$ and a connection broker B. Each of the user devices 102a, 102b and 102c at least corresponds to one of the virtual machines $VM_P$ and $VM_J$, and each of the virtual machines $VM_P$ and $VM_J$ corresponds to at least one resource. Moreover, the virtual machines $VM_P$ and $VM_J$ are respectively connected to the connection broker B. As shown in FIG. 1, the virtual machine $VM_P$ corresponds to the user device 102a of the user P, and the virtual machine $VM_J$ corresponds to the user device 102c of the user J. In the present embodiment, as shown in FIG. 1, in the resource sharing system 104, the virtual machines $VM_P$ and $VM_J$ are respectively provided by different physical devices 106a and 106b, and the connection broker B and the virtual machines $VM_P$ and $VM_J$ are respectively provided by different physical devices (the connection broker B is provided by a physical device 108 which is different from the physical devices 106a and 106b). The physical device is, for example, a computer unit or a computer, and preferably, the physical device is, for example, a server.

Figure 2:
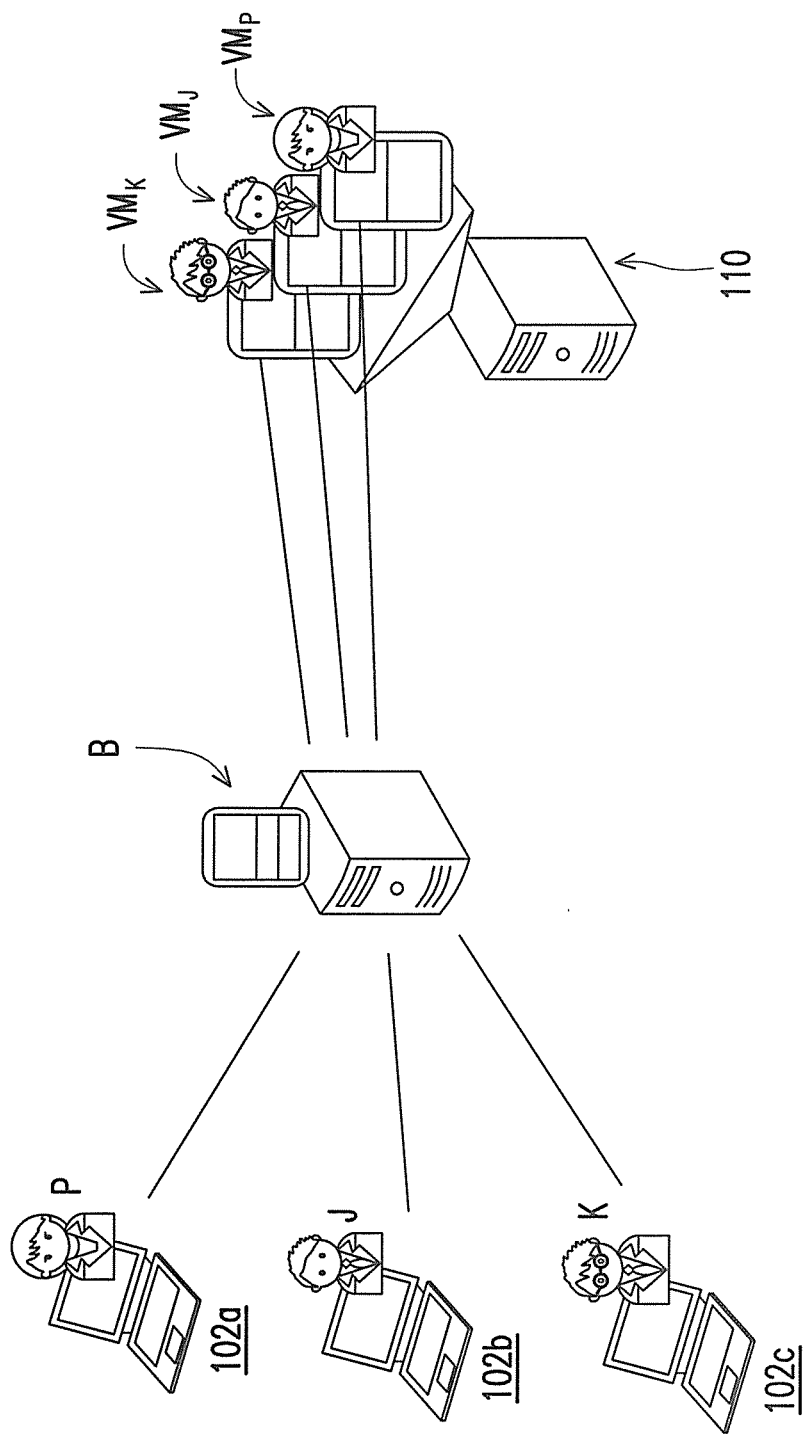
FIG. 2 is a schematic diagram illustrating a resource sharing system of multiple user devices according to another embodiment of the invention.

FIG. 2 is a schematic diagram illustrating a resource sharing system of multiple user devices according to another embodiment of the invention. In the present embodiment, each of virtual machines $VM_K$, $VM_J$ and $VM_P$ corresponds to one of the user devices 102c, 102b and 102a. The virtual machines $VM_K$, $VM_J$ and $VM_P$ are provided by a same physical device 110. In the above embodiments, the virtual machines and the connection broker can be respectively provided by different physical devices, and the virtual machines can be respectively provided by different physical devices or provided by a same physical device. However, the invention is not limited thereto, and in other embodiments, a part of or all of the virtual machines and the connection broker B can be provided by the same physical device (not shown).

Figure 3:
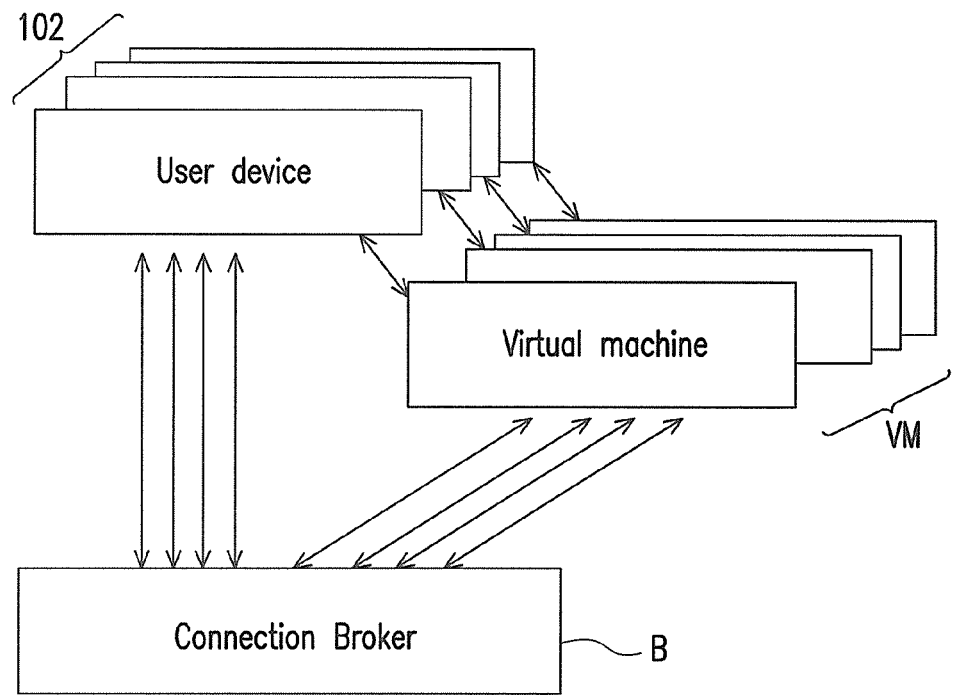
FIG. 3 is a block diagram illustrating a resource sharing system of multiple user devices according to an embodiment of the invention.
Figure 4A:
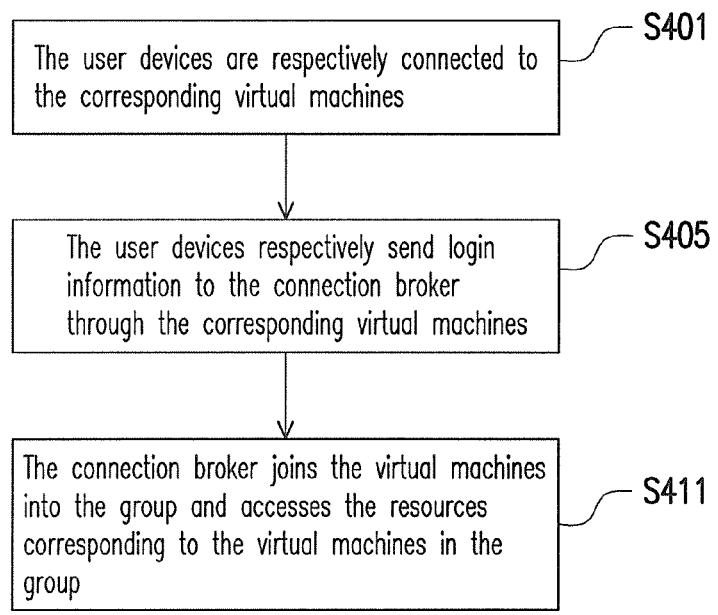
FIG. 4A is a flowchart of a method for joining virtual machines into a group in a resource sharing method according to an embodiment of the invention.
Figure 4B:
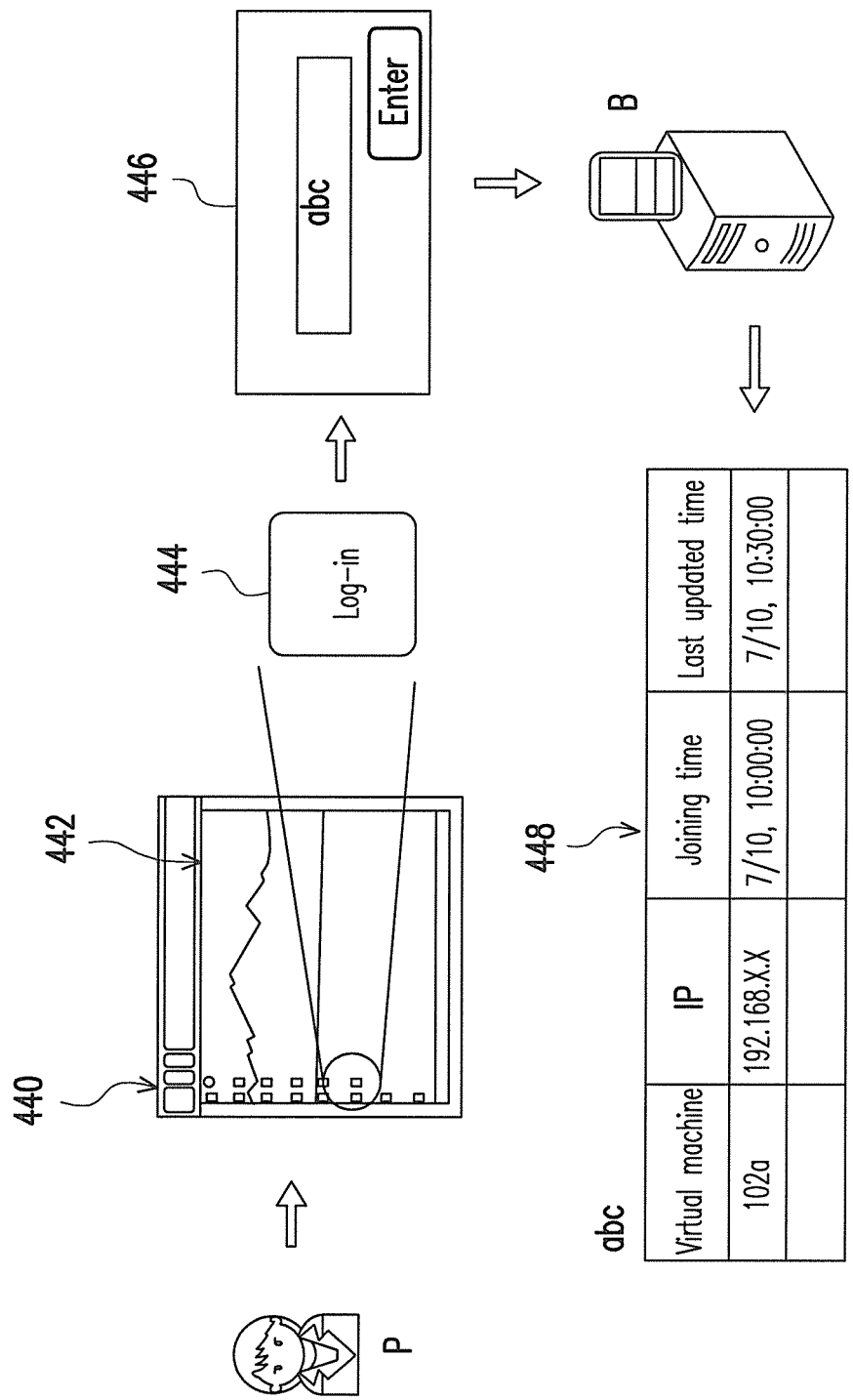
FIG. 4B is a schematic diagram illustrating the method of FIG. 4A.

FIG. 3 is a block diagram illustrating a resource sharing system of multiple user devices according to an embodiment of the invention. FIG. 4A is a flowchart of a method for joining virtual machines into a group in a resource sharing method according to an embodiment of the invention. FIG. 4B is a schematic diagram illustrating the method of FIG. 4A. Referring to FIG. 3, FIG. 4A and FIG. 4B, in step S401, the user devices 102 (including 102a, 102b and 102c) respectively connect to the corresponding virtual machines VM (including $VM_P$, $VM_J$ and $VM_K$). In detail, in the present embodiment, after the user devices 102 are connected to the corresponding virtual machines VM, each user can browse an operating system screen of the corresponding virtual machine VM through a browser installed in the user device 102. For example, referring to FIG. 4B, the user P connects the user device 102a to the corresponding virtual machine $VM_P$, so that the user P can browse an operating system screen 442 of the virtual machine $VM_P$ through a browser window 440 opened on the user device 102a. The operating system screen 442 is, for example, a desktop image.

In step S405, the connection broker B receives login information from each of the virtual machines VM. Namely, the connection broker B identifies the virtual machine sending the login information through the received login information. In some embodiments, if an identification name of the virtual machine is ever registered on the connection broker B, the identification name is required to be provided to the connection broker B for identification when the virtual machine is about to log in the connection broker B afterwards. In detail, referring to FIG. 4B, the user P can click an image 444 representing a group login function on the operating system screen 442 of the virtual machine $VM_P$ displayed in the browser window 440 of the browser, so that a group login dialog box 446 is popped up on the browser window 440 to facilitate the user P inputting a group name (for example, "abc" shown in FIG. 4B) to be joined, and the virtual machine $VM_P$ accordingly sends the login information to the connection broker B. In some other embodiments, a group logger in a group agent in the virtual machine sends the login information to the connection broker B according to the group name input by the user.

In step S411, the connection broker B joins the virtual machines VM sending the login information into a group according to each of the login information, and the user devices 102 commonly access the resources corresponding to the virtual machines VM joined in the group through the connection broker B. Namely, the virtual machines VM joined in the same group can share the corresponding resources thereof within the group through the operation of the connection broker B, and different users in the same group can further connect the same virtual machine through the connection broker B to operate (which is described later) the same resource (for example, a digital file or a physical resource).

Figure 4C:
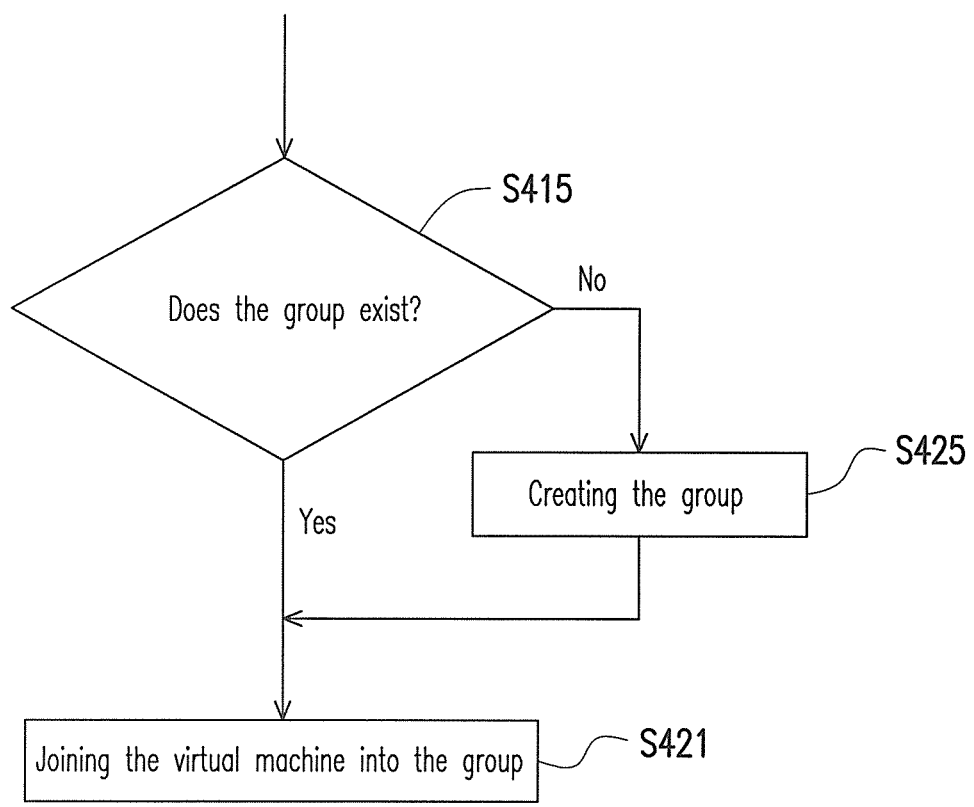
FIG. 4C is a flowchart of a method for joining virtual machines into a group in a resource sharing method according to another embodiment of the invention.

The step S411 that the connection broker B joins the virtual machines VM sending the login information into the group is further described with reference of FIG. 4C. FIG. 4C is a flowchart of a method for joining virtual machines into a group in a resource sharing method according to another embodiment of the invention. Referring to FIG. 4C, in the present embodiment, after the connection broker B receives the login information, the connection broker B determines whether the group that the virtual machines VM are about to be joined in exists (step S415). When the group that the virtual machines VM are about to be joined in already exists, the connection broker B joins the virtual machines VM into the group (S421). On the other hand, when the group is not created, the connection broker B creates the group (step S421), and joins the virtual machines VM into the group (step S425).

In detail, in another embodiment, when the group that the virtual machines VM are about to be joined in already exists, the connection broker B joins the virtual machines VM into the group, and a group login log(for example, a group login log 448 of the group abc shown in FIG. 4B) of the connection broker B records related information of the newly joined virtual machines, for example, an internet protocol (IP) address and an joining time, etc. of each of the virtual machines VM. In another embodiment, when the group is not created, a group controller of the connection broker B creates the group, so as to join the virtual machines VM into the group.

It should be noticed that when the users connect the user devices to the corresponding virtual machines, and after the connection broker joins the virtual machines into the group, a snapshot of an operating system screen of each of the virtual machines in the group is displayed in a multi-display window of each of the user devices. FIG. 4D is a schematic diagram illustrating a multi-display window according to an embodiment of the invention. Referring to FIG. 4D, when the virtual machines $VM_P$ and $VM_J$ corresponding to the user P and the user J are joined into the same group, the user device displays a multi-display window 432, and the multi-display window 432 displays a snapshot $SS_P$ of the operating system screen of the virtual machine $VM_P$ corresponding to the user P and a snapshot $SS_J$ of the operating system screen of the virtual machine $VM_J$ corresponding to the user J. It should be noticed that the user device can open a multi-display window through a browser to display all of the snapshots, or displays all of the snapshots in a multi-display sub window in an opened browser window.

Figure 4E:
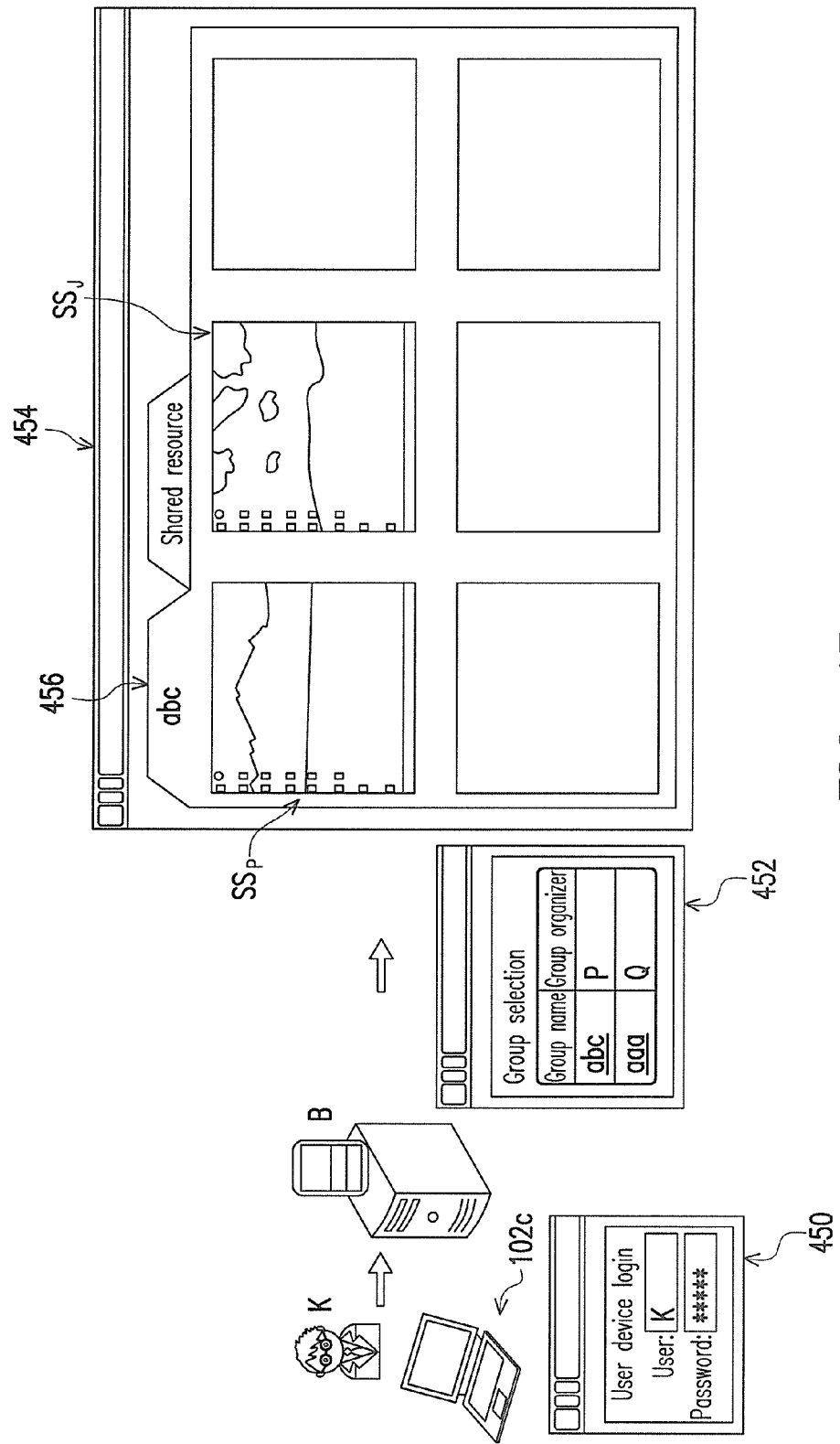
FIG. 4E is a schematic diagram illustrating a method of joining a user without a corresponding virtual machine into a group according to still another embodiment of the invention.

FIG. 4E is a schematic diagram illustrating a method of joining a user without a corresponding virtual machine into a group according to still another embodiment of the invention.

Referring to FIG. 4E, when the user K does not have a corresponding virtual machine, the user K can directly log in the connection broker B through the user device 102c (shown as a user login human-machine interface in FIG. 4E), and the user K can select a group desired to join from a group selection menu 452 provided by the connection broker B. For example, as shown in FIG. 4E, the user K directly logs in the connection broker B, and a group controller of the connection broker B provides the existing groups (including the groups abc and aaa shown in FIG. 4E). In FIG. 4E, the user K selects to join the group abc that the users P and J have already joined, and a browser window 454 of a browser of the user device 102c of the user K displays a multi-display sub window 456, where the multi-display sub window 456 displays the snapshots of the operating system screens of the virtual machines corresponding to the other users in the group abc (for example, the snapshots $SS_J$ and $SS_P$ in FIG. 4E).

A plurality of embodiments is provided below with reference of FIG. 5A to FIG. 9 to describe the aforementioned step S411 that the user devices 102 share and access the resources corresponding to the virtual machines VM in the group through the connection broker B.

Figure 5A:
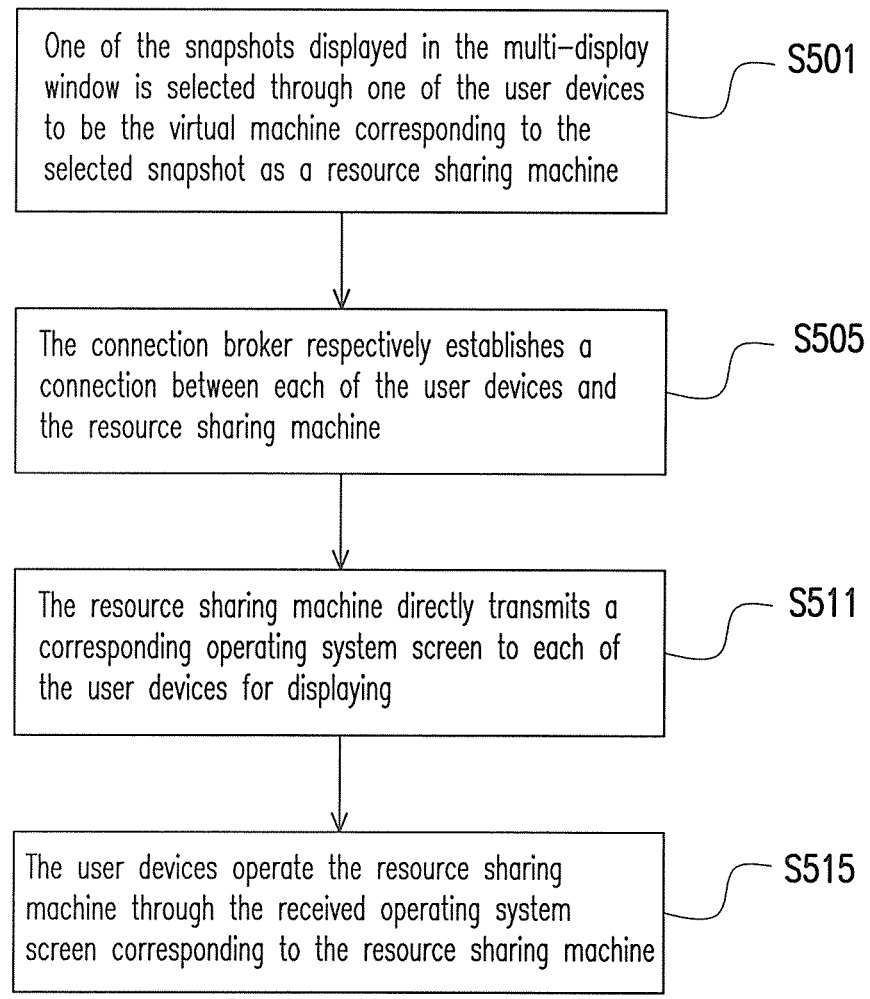
FIG. 5A is a flowchart illustrating a method that user devices commonly operate a resource sharing machine in a resource sharing method according to an embodiment of the invention.
Figure 5B:
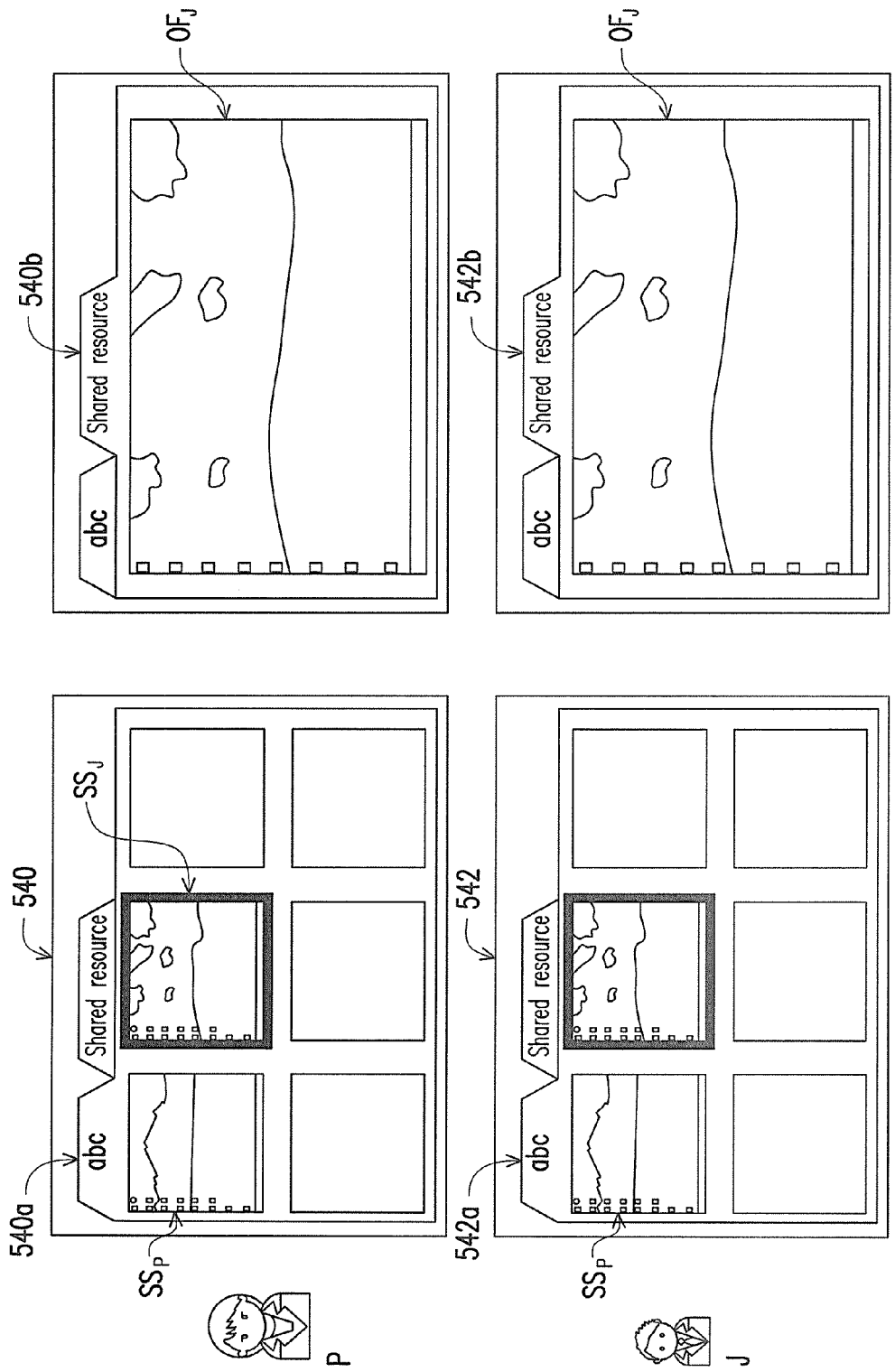
FIG. 5B is a schematic diagram illustrating an operating system screen of a resource sharing machine displayed on user devices.

FIG. 5A is a flowchart illustrating a method that user devices commonly operate a resource sharing machine in a resource sharing method according to an embodiment of the invention. FIG. 5B is a schematic diagram illustrating an operating system screen of a resource sharing machine displayed on user devices. Referring to FIG. 5A, when one of the snapshots displayed in the multi-display window is selected through one of the user devices to be the virtual machine VM corresponding to the selected snapshot as a resource sharing machine (step S501), the connection broker B respectively establishes a connection between each of the user devices corresponding to the virtual machines in the group and the resource sharing machine (step S505). Then, the resource sharing machine directly transmits a corresponding operating system screen to each of the user devices for displaying (step S511), and the user devices operate the resource sharing machine through the received operating system screen corresponding to the resource sharing machine, and share the resource corresponding to the resource sharing machine (step S515).

For example, when one of the users directly selects one of the snapshots, a virtual machine redirector in the connection broker B transmits connection information of the virtual machine corresponding to the selected snapshot to the user devices corresponding to the virtual machines in the same group. When the user devices receives the connection information, a virtual machine client unit of each of the user devices sends a connection request to the virtual machine serving as the resource sharing machine. After the virtual machine serving as the resource sharing machine receives the connection request from each of the user devices, a virtual machine sharing server therein establishes the connection with each of the user devices and directly transmits the operating system screen of the virtual machine (the resource sharing machine) to each of the user devices, so that the user devices can operate the virtual machine (the resource sharing machine) through the operating system screen, and share the corresponding resource of the virtual machine.

In detail, referring to FIG. 5B, after the virtual machines $VM_P$ and $VM_J$ corresponding to the user P and the user J are joined into the same group abc, the snapshot $SS_P$ of the operating system screen of the virtual machine $VM_P$ corresponding to the user P and the snapshot $SS_J$ of the operating system screen of the virtual machine $VM_J$ corresponding to the user J are displayed in multi-display sub windows 540a and 542a in browse windows 540 and 542 on the user devices of the user P and the user J. When one of the users P and J selects the snapshot $SS_J$ (encircled by a thick frame) to be the virtual machine $VM_J$ corresponding to the snapshot $SS_J$ as a resource sharing machine, the virtual machine $VM_J$ serving as the resource sharing machine directly transmits its operating system screen $OF_J$ to each of the user devices for displaying, so that the operating system screen $OF_J$ of the virtual machine $VM_J$ is displayed in shared resource sub windows 540b and 542b in the browser windows 540 and 542 on the user devices of the users P and J. After the shared resource sub windows 540b and 542b of the user devices display the operating system screen $OF_J$ of the virtual machine $VM_J$, the users P and J can directly operate the operating system screen $OF_J$ displayed on the user devices, for example, edit a same file, or share the resource corresponding to the virtual machine $VM_J$. In this way, all of the users can operate the resource sharing machine and share the resource corresponding to the resource sharing machine through the respective user devices.

Figure 5C:
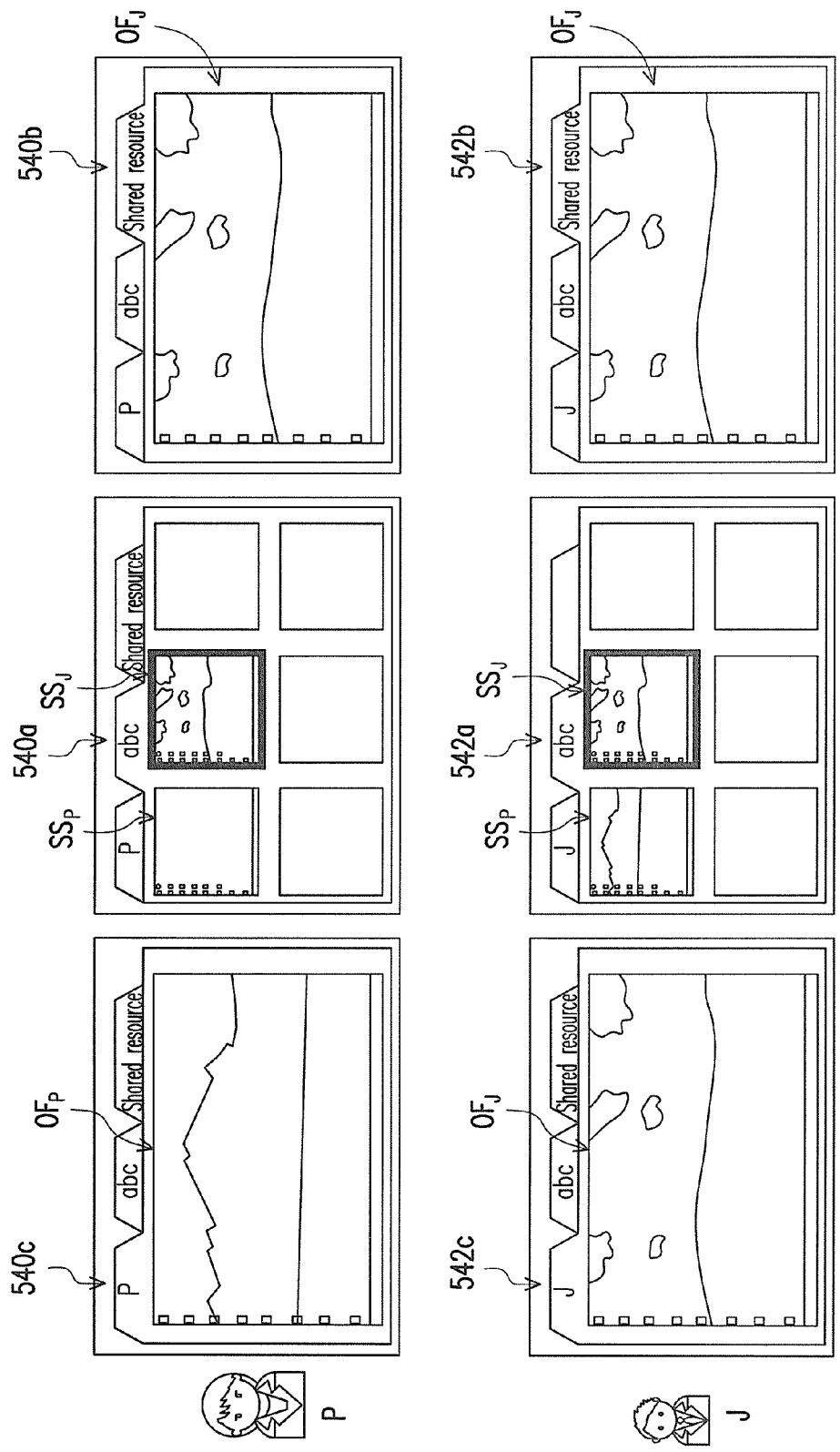
FIG. 5C is a schematic diagram illustrating an operating system screen of a resource sharing machine displayed on user devices.

In FIG. 5B, the browser window of each of the user devices only includes the group abc multi-display sub window and the shared resource sub window, though the invention is not limited thereto. FIG. 5C is a schematic diagram illustrating an operating system screen of a resource sharing machine displayed on user devices. As shown in FIG. 5C, besides including the group abc multi-display sub windows 540a and 542a and the shared resource sub windows 540b and 542b, the browser windows 540 and 542 of the user devices also include respective virtual machine sub windows 540c and 542c of the corresponding virtual machines $VM_P$ and $VM_J$ to display the respective operating system screens $OF_P$ and $OF_J$ the virtual machines $VM_P$ and $VM_J$. Therefore, each of the users can switch to browse the virtual machine sub window, the group multi-display sub window or the shared resource sub window in the browser window displayed on the respective user device by using a cursor to select a different sub window.

Moreover, in the above embodiment, the sub windows in the browser window of each of the user devices are arranged in an overlap manner. However, the invention is not limited thereto. Namely, the sub windows in the browser window of each of the user devices can be arranged in a non-overlap manner or in a partial overlap manner.

Figure 6A:
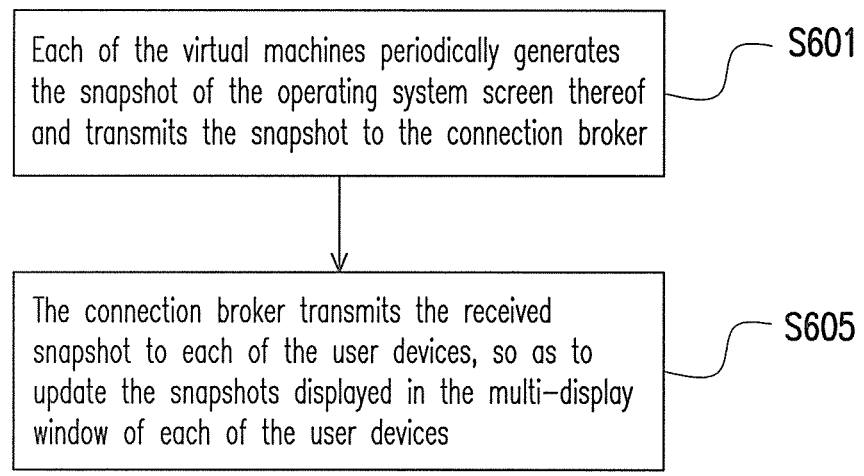
FIG. 6A is a flowchart illustrating a method of periodically updating snapshots in multi-display windows displayed on user devices in a resource sharing method according to an embodiment of the invention.
Figure 6B:
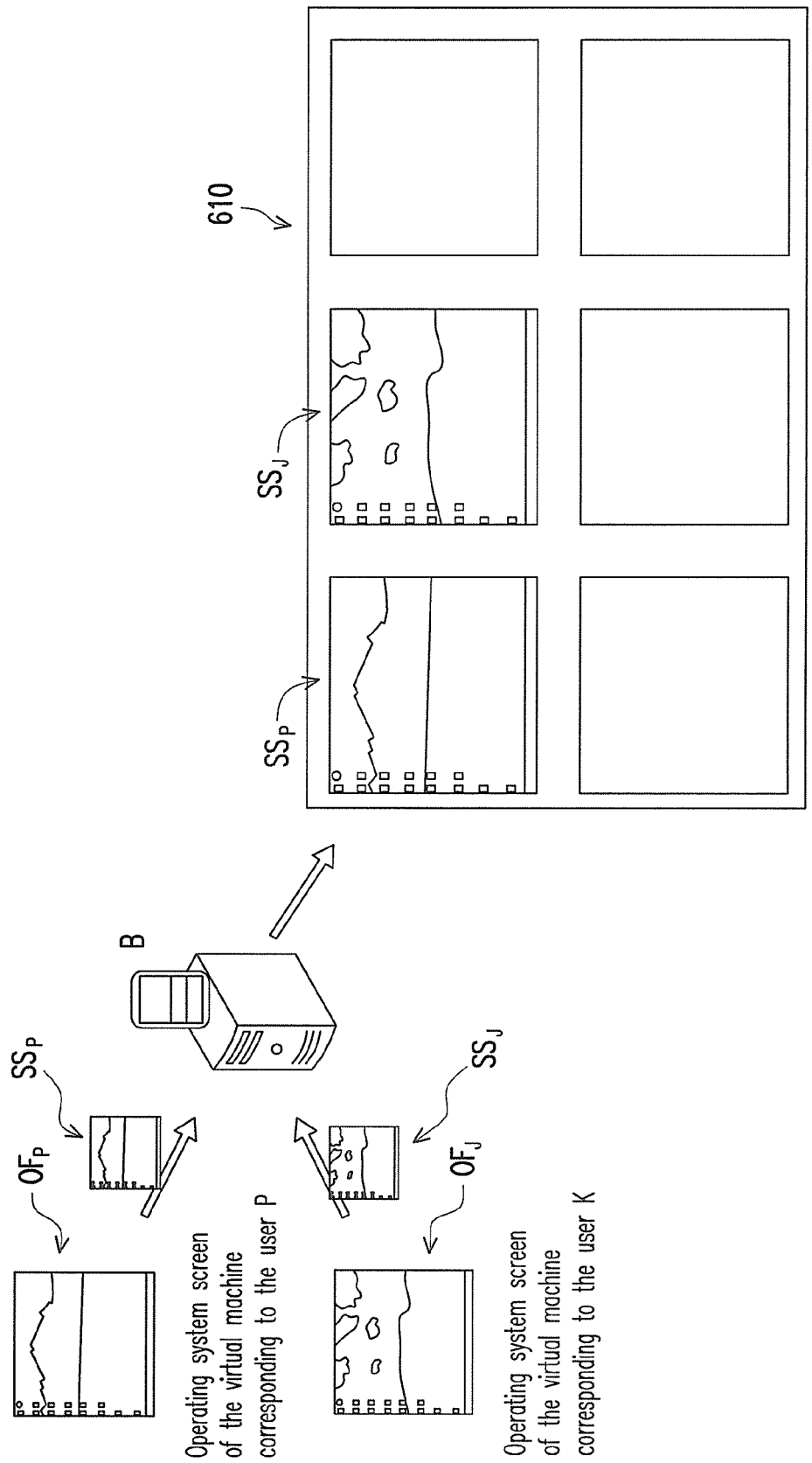
FIG. 6B is a schematic diagram of the method of FIG. 6A.

FIG. 6A is a flowchart illustrating a method of periodically updating snapshots in multi-display windows displayed on user devices in a resource sharing method according to an embodiment of the invention. FIG. 6B is a schematic diagram of the method of FIG. 6A. Referring to FIG. 6A, each of the virtual machines VM in the group periodically generates the snapshot SS of the operating system screen OF thereof and transmits the snapshot SS to the connection broker B (step S601). Then, the connection broker B transmits the received snapshot SS to each of the user devices corresponding to the virtual machines in the group, so as to update the snapshots SS displayed in the multi-display window of each of the user devices (step S605).

For example, a snapshot generator of each of the virtual machines in the group periodically captures the operating system screen thereof, and compresses the captured operating system screen into a snapshot. Then, the virtual machine transmits the snapshot to the connection broker. After the connection broker receives the snapshots, a snapshot updater therein transmits the snapshots to each of the user devices corresponding to the virtual machines in the group, so as to update the snapshots displayed in the multi-display window of each of the user devices. Meanwhile, the group login log of the connection broker records an updating time of the snapshot corresponding to each of the virtual machines.

In detail, referring to FIG. 6B, the virtual machines $VM_P$ and $VM_J$ periodically generate the snapshots $SS_P$ and $SS_J$ of the operating system screens $OF_P$ and $OF_J$ the virtual machines $VM_P$ and $VM_J$ corresponding to the user P and the user J, and transmit the snapshots $SS_P$ and $SS_J$ to the connection broker B, and the connection broker B transmits the received snapshots $SS_P$ and $SS_J$ to each of the user devices to update the snapshots SS displayed in the multi-display window 610.

Figure 7A:
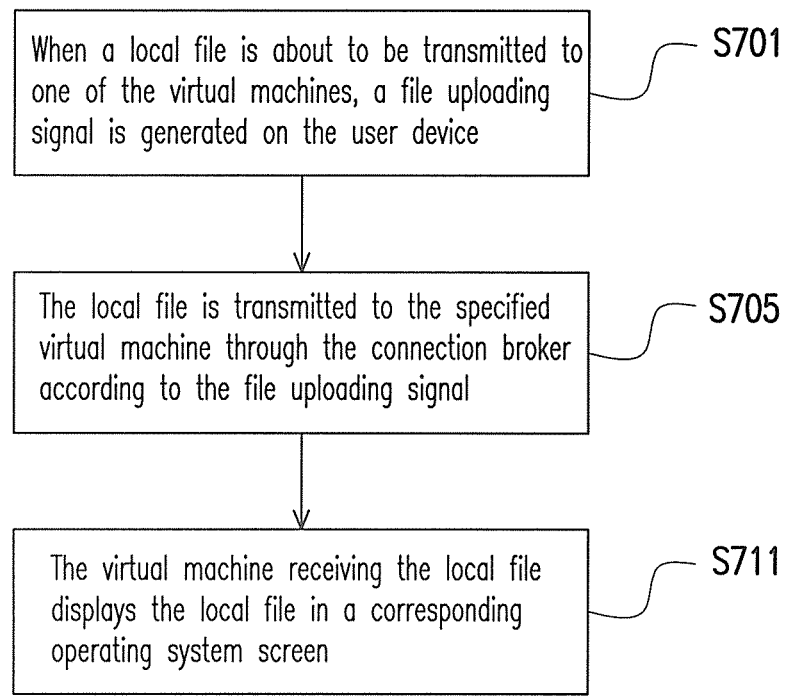
FIG. 7A is a flowchart illustrating a method of uploading a local file from a user device to a virtual machine in a resource sharing method according to an embodiment of the invention.
Figure 7B:
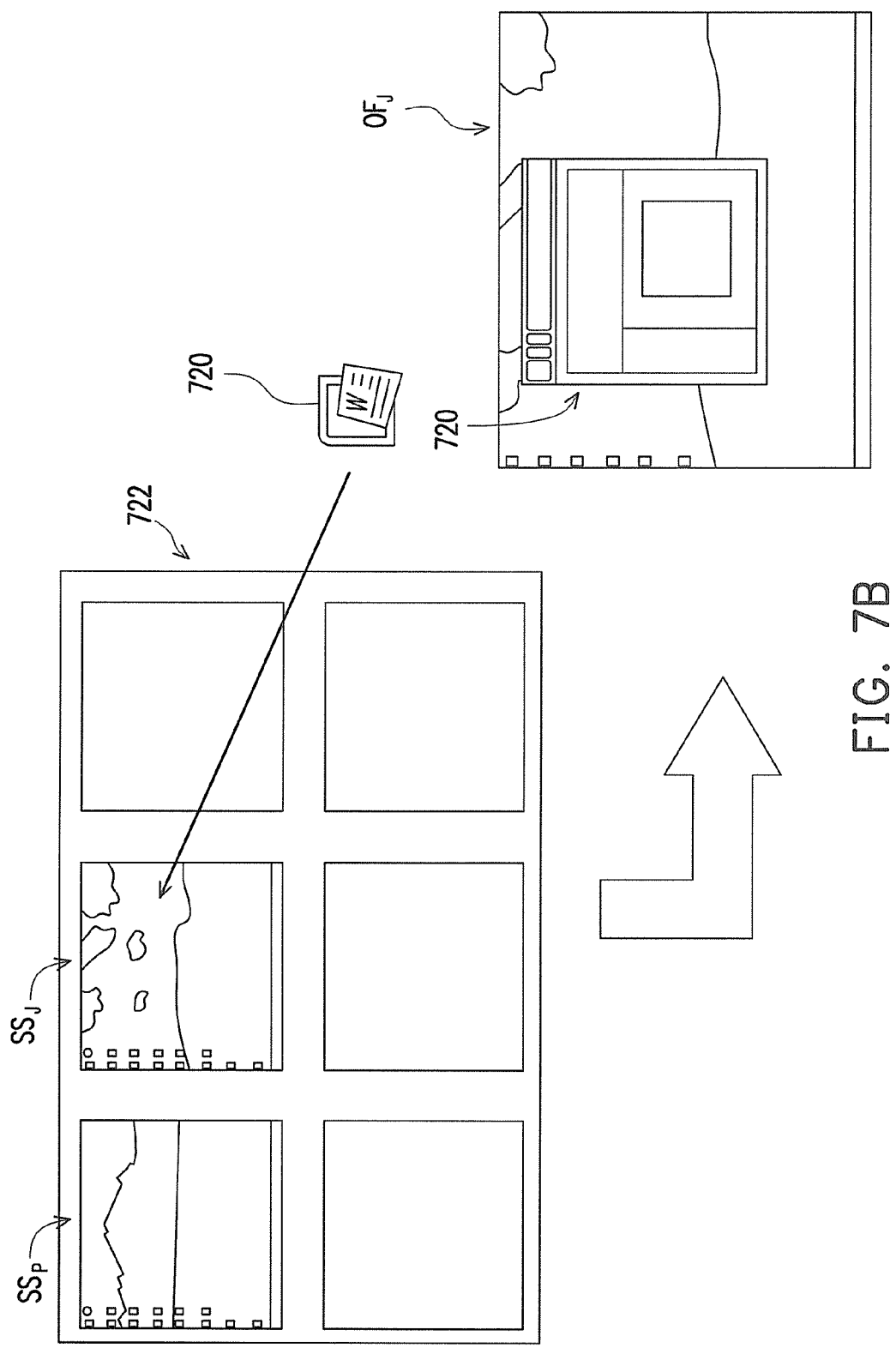
FIG. 7B is a schematic diagram of the method of FIG. 7A.

FIG. 7A is a flowchart illustrating a method of uploading a local file from a user device to a virtual machine in a resource sharing method according to an embodiment of the invention. FIG. 7B is a schematic diagram of the method of FIG. 7A. Referring to FIG. 7A, when a user wants to upload a local file to one of the virtual machines VM in the group, a file uploading signal is generated on the user device (step S701). The local file is transmitted from the user device to the specified virtual machine through the connection broker B according to the file uploading signal (step S705). The virtual machine receiving the local file displays the local file in a corresponding operating system screen (step S711).

For example, the user drags a local file to the snapshot corresponding to the specified virtual machine that is displayed on the user device, or copies the local file and attaches the snapshot corresponding to the specified virtual machine, so as to generate the file uploading signal. Then, a file uploader in the connection broker B uploads the local file to the destination virtual machine, and a file receiver of the destination virtual machine receives the uploaded file, or the file is opened in the operating system screen of the destination virtual machine.

In detail, referring to FIG. 7B, when the user drags an image of a local file 720 on the user device to the snapshot $SS_J$ displayed in the multi-display window 722 to generate the file uploading signal, the local file 720 is transmitted to the virtual machine $VM_J$ corresponding to the snapshot $SS_J$ through the connection broker B, and the image of the local file 720 is displayed on the operating system screen $OF_J$ of the virtual machine $VM_J$, or the local file 720 is opened.

Figure 8A:
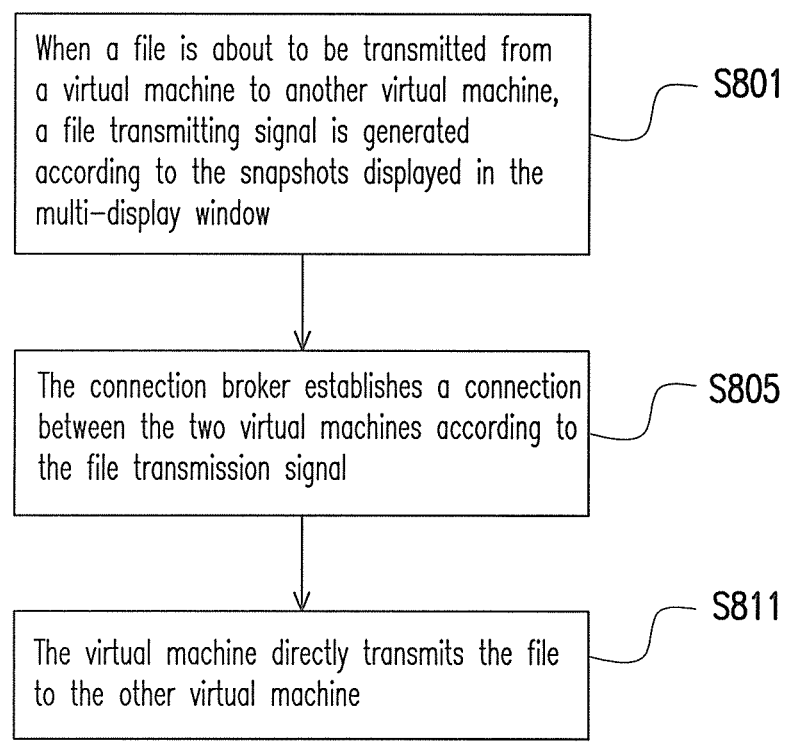
FIG. 8A is a flowchart illustrating a method of transmitting a file between virtual machines in a resource sharing method according to an embodiment of the invention.

FIG. 8A is a flowchart illustrating a method of transmitting a file between virtual machines in a resource sharing method according to an embodiment of the invention. FIG. 8B is a schematic diagram of the method of FIG. 8A. Referring to FIG. 8A, when a user wants transmits a file from a virtual machine $VM_A$ in the group to another virtual machine $VM_B$ in the group, a file transmission signal/command is generated according to the snapshots displayed in the multi-display window of the user device (step S801). The connection broker B establishes a connection between the virtual machine $VM_A$ and the virtual machine $VM_B$ respectively located at a start end and a destination end of the file transmission path according to the file transmission signal/command (step S805). Then, the virtual machine $VM_A$ at the start end of the file transmission path directly transmits the file to the virtual machine $VM_B$ at the destination end (step S811).

For example, when the user moves or copies an image of a file on the user device from a snapshot $SS_A$ to another snapshot $SS_B$ according to a dragging manner or a copy-attach manner, a file command generator in the connection broker B generates a file transmission command according to the above operation, and a file command dispenser in the connection broker B transmits the file transmission command to the virtual machine $VM_A$ corresponding to the snapshot $SS_A$, and the virtual machine $VM_A$ receives the file transmission command, and establishes a connection with the virtual machine $VM_B$, and starts to transmit the file to the virtual machine $VM_B$.

In detail, referring to FIG. 8B, the user drags a file 822 from the snapshot $SS_J$ displayed in the multiple-display window 820 on the user device to the snapshot $SS_P$ to generate a file transmission signal/command, and the connection broker B establishes a connection between the virtual machine $VM_J$ corresponding to the snapshot $SS_J$ and the virtual machine $VM_P$ corresponding to the snapshot $SS_P$, so that the file 822 can be directly transmitted from the virtual machine $VM_J$ to the virtual machine $VM_P$.

Figure 9:
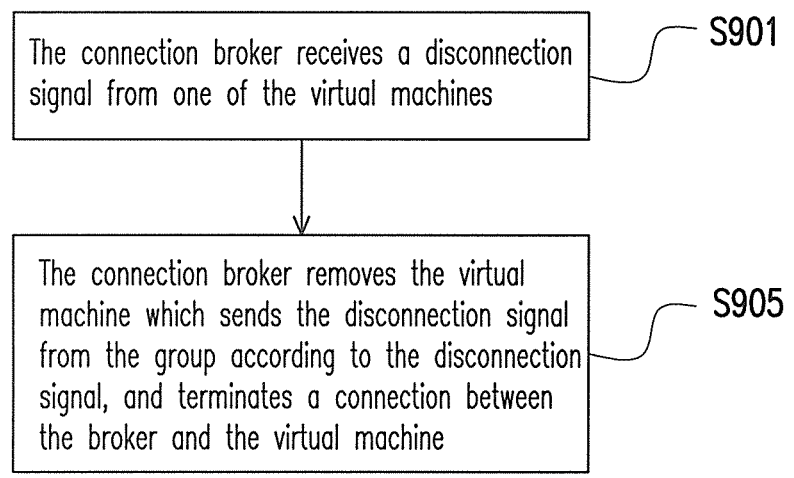
FIG. 9 is a flowchart illustrating a method of removing a group in a resource sharing method according to an embodiment of the invention.

FIG. 9 is a flowchart illustrating a method of removing a group in a resource sharing method according to an embodiment of the invention. Referring to FIG. 3 and FIG. 9, the connection broker B receives a disconnection signal from one of the virtual machines VM (step S901), and removes the virtual machine sending the disconnection signal from the group according to the disconnection signal, and terminates a connection between the connection broker B and the virtual machine (step S905).

In summary, by establishing a resource sharing mechanism on cloud virtual machines, a simple connection and sharing process of resources can be established. Moreover, users of a cross-area network can browse the operating system screens of the virtual machines corresponding to the users through a multi-display resource sharing environment, and synchronously update the operating system screens or synchronously modify a same file. Moreover, according to the aforementioned mechanism of accessing the resources corresponding to the virtual machines in the group through the connection broker, the user can open browser windows through browsers to inspect the operating system screens of all of the virtual machines, so as to easily share and access various resources within a webpage-based group.

In other words, according to the resource sharing system of the invention and the method thereof, a connection broker is used to implement file transmission among the virtual machines, communication (including file transmission) between the user devices and the virtual machines, and connections between the user devices of multiple users and the virtual machine serving as the resource sharing machine through the connection broker, so as to operate the resource sharing device and share the resource corresponding to the resource sharing machine/virtual machine to achieve purposes of resource sharing and simultaneous accessing. Moreover, according to the resource sharing system of the invention and the method thereof, a multi-display resource sharing environment is provided to the users, and the users share the resources within the multi-display resource sharing environment, and update the snapshots of the operating system screens of the virtual machines within the multi-display resource sharing environment in real-time, so as to simplify an operation flow of resource sharing and improve utilization convenience.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A resource sharing system for a plurality of user devices accessing at least one resource at the same time, the resource sharing system comprising:
a plurality of virtual machines provided by at least one computer, wherein each of the user devices corresponds to one of the virtual machines, and each of the at least one resource corresponds to one of the virtual machines; and
a connection broker, connected to the virtual machines, receiving login information from each of the virtual machines, and joining each of the virtual machines sending the login information into a group according to the login information, wherein the user devices access the resources corresponding to the virtual machines in the group through the connection broker.

2. The resource sharing system as claimed in claim 1, wherein when the connection broker receives the login information of each of the virtual machines, the connection broker determines whether the group already exists according to the login information, and when the group already exists, the connection broker joins the virtual machine into the group, and when the group does not exist, the connection broker creates the group and joins the virtual machine into the group.

3. The resource sharing system as claimed in claim 1, wherein a snapshot of an operating system screen of each of the virtual machines in the group is displayed on a multi-display window on each of the user devices corresponding to the virtual machines in the group, and each of the virtual machines periodically generates the snapshot of each of the operating system screens and transmits the snapshot to the connection broker, and the connection broker transmits the received snapshots to each of the user devices corresponding to the virtual machines in the group, so as to update the snapshots displayed on the multi-display window of each of the user devices.

4. The resource sharing system as claimed in claim 1, wherein [a snapshot of an operating system screen] of each of the virtual machines in the group is displayed on a multi-display window of each of the user devices, and in case that the connection broker accesses the resource, when one of the snapshots is selected through one of the user devices to be the virtual machine corresponding the selected snapshot as a resource sharing machine, the connection broker respectively establishes a connection between each of the user devices and the resource sharing machine, so that the resource sharing machine directly transmits the corresponding operating system screen to each of the user devices corresponding to the virtual machines in the group, and the user devices operate the resource sharing machine through the received operating system screen corresponding to the resource sharing machine.

5. The resource sharing system as claimed in claim 1, wherein a snapshot of an operating system screen of each of the virtual machines in the group is displayed on a multi-display window on each of the user devices corresponding to the virtual machines in the group, and the connection broker accessing the resource is to transmit a file from one of the user devices to one of the virtual machines through the connection broker, and the virtual machine receiving the file displays the file in the corresponding operating system screen.

6. The resource sharing system as claimed in claim 1, wherein a snapshot of an operating system screen of each of the virtual machines in the group is displayed on a multi-display window on each of the user devices corresponding to the virtual machines in the group, and in case that the connection broker accesses the resource, a connection is established between any two of the virtual machines in the group, so that a file is directly transmitted between the virtual machines when the connection is established.

7. The resource sharing system as claimed in claim 1, wherein the connection broker receives a disconnection signal from one of the virtual machines, and removes the virtual machine sending the disconnection signal from the group according to the disconnection signal, and terminates a connection between the connection broker and the virtual machine which sends the disconnection signal.

8. A resource sharing method for a plurality of user devices accessing at least one resource at the same time, the resource sharing method comprising:

connecting each of the user devices to a virtual machine, wherein each of the virtual machines corresponds to one of the at least one resource;

each of the user devices sending login information through the corresponding virtual machine;

joining the virtual machine sending the login information into a group according to each of the login information; and accessing the resources corresponding to the virtual machines in the group by the user devices corresponding to the virtual machines in the group.

9. The resource sharing method as claimed in claim 8, wherein the step of joining the virtual machine sending the login information into the group according to each of the login information comprises:

determining whether the group already exists according to the login information, joining the virtual machine into the group when the group already exists, and creating the group and joining the virtual machine into the group when the group does not exist.

10. The resource sharing method as claimed in claim 8, wherein a snapshot of an operating system screen of each of the virtual machines in the group is displayed on a multi-display window on each of the user devices corresponding to the virtual machines in the group, and the step of accessing the resources corresponding to the virtual machines in the group comprises:

periodically generating the snapshot of each of the operating system screens;

transmitting the generated snapshots to each of the user devices corresponding to the virtual machines in the group; and updating the snapshots displayed on the multi-display window of each of the user devices.

11. The resource sharing method as claimed in claim 8, wherein a snapshot of an operating system screen of each of the virtual machines in the group is displayed on a multi-display window of each of the user devices, and when one of the snapshots is selected through one of the user devices to be the virtual machine corresponding the selected snapshot as a resource sharing machine, the step of accessing the resources corresponding to the virtual machines in the group comprises:

respectively establishing a connection between each of the user devices and the resource sharing machine;

directly transmitting the corresponding operating system screen to each of the user devices corresponding to the virtual machines in the group by the resource sharing machine; and the user devices operating the resource sharing machine through the received operating system screen corresponding to the resource sharing machine.

12. The resource sharing method as claimed in claim 8, wherein a snapshot of an operating system screen of each of the virtual machines in the group is displayed on a multi-display window on each of the user devices corresponding to the virtual machines in the group, and the step of accessing the resources corresponding to the virtual machines in the group comprises:

transmitting a file from one of the user devices to one of the virtual machines; and displaying the file in the operating system screen corresponding to the virtual machine receiving the file.

13. The resource sharing method as claimed in claim 8, wherein a snapshot of an operating system screen of each of the virtual machines in the group is displayed on a multi-display window on each of the user devices corresponding to the virtual machines in the group, and the step of accessing the resources corresponding to the virtual machines in the group comprises:

establishing a connection between any two of the virtual machines of the virtual machines in the group; and directly transmitting a file between the virtual machines established with the connection.

14. The resource sharing method as claimed in claim 8, further comprising:

receiving a disconnection signal from one of the virtual machines; and removing the virtual machine sending the disconnection signal from the group according to the disconnection signal.

\* \* \* \* \*